July 8, 1952 E. LANGEN 2,602,762
PROCESS AND APPARATUS FOR THE EXTRACTION OF BEET SUGAR
Filed Feb. 27, 1950 2 SHEETS—SHEET 2

INVENTOR.
EUGEN LANGEN
BY
Burgess, Ryan & Hicks
ATTORNEYS

Patented July 8, 1952

2,602,762

UNITED STATES PATENT OFFICE 2,602,762

PROCESS AND APPARATUS FOR THE EXTRACTION OF BEET SUGAR

Eugen Langen, Elsdorf, Germany, assignor, by mesne assignments, to Superior Sugar Extraction, Inc., New York, N. Y., a corporation of New York Application February 27, 1950, Serial No. 146,489
In Germany February 28, 1949

9 Claims. (Cl. 127—7)

The present invention relates to improvements in process and apparatus for the extraction of soluble materials. It relates more particularly to improvements in a process and apparatus for the extraction of sugar from sugar beet slices.

An object of the present invention is to provide for the continuous feeding of raw material, such as slices of sugar beets, at a constant predetermined rate to an extraction tower in which the extraction of sugar from the beet slices is carried out by moving the beet slices countercurrent to the flow of an extracting liquid.

The difficulties which had to be overcome in this connection are caused primarily by the nature of the raw material, such as the sugar beet slices, that is to be worked and which with known means can only be introduced into an extraction tower very irregularly. Particularly in connection with larger tower diameters, troublesome variations have repeatedly occurred in that with different kinds of sugar beets, the rate of admission of the slices must be either reduced or increased, or that the column of slices arranged above the charging place becomes greater or smaller than desired. The charging rate also varies with the juice removal inasmuch as the rising of the juice flowing countercurrent to the beet slices depends on this and finally also the air introduced into the juice acts in the same manner due to the fact that the foam, which necessarily forms due to the air, causes a damming-up both in the beet slice admission and also in the juice discharge.

These difficulties are eliminated by the present invention in an extremely simple and practical manner. The present invention provides for introducing the slices of sugar beets under pressure at the top of the vertical extraction tower at a point below the level of the discharging raw juice. In this connection, the feeding of the raw material to the extraction tower may be carried out by means known per se; for example, through a worm which also can be used as a measuring device by regulating its speed as by inserting a variable gear in its driving connections. This makes it possible to obtain a constant and uniform feed of the sugar beet slices (at the desired rate) and in conjunction with this, the quantity of extraction liquid supplied to the tower may be regulated to correspond to the correct quantity for the quantity of beet slices being introduced into the tower. The correct and constantly uniform ratio of quantity of liquid to quantity of beet slices is of decisive importance for the economic operation of the extracting plant inasmuch as the degree of extraction and the sugar yield depend thereon.

A further development of the invention is directed to the particular manner in which the beet slices are fed to the extraction tower. The present invention provides for introducing the slices tangentially to, or on one side of the center of the cross-section, of the extraction tower and in a direction opposite to the direction of rotation of the rotating conveyor worm in the extraction tower rather than at the center of the tower. In this way, the slices which are already in the extraction tower are prevented by the newly added slices from following the movement of rotation of the worm; i. e., in this way there is improved for all practical purposes the action of the jacket friction.

Another feature of the invention is that it makes possible the use of a distributor at a point immediately above the laterally displaced beet slice feed and which is rotated in a direction opposite to the rotation of the main feed worm in the tower. This distributor assures not only an absolutely uniform distribution of the slices over the cross section of the extraction tower, but it also acts as retainer in counteracting the rotation of the material in the tower. The distributor is preferably provided with downwardly extending members having surfaces which are obliquely inclined so that slices which might be pushed upwards at the top of the conveyor worm are retained and are forced downwards.

The present invention also provides for the elimination of any air surrounding or entrapped by the beet slices or entrapped by the mass prior to the introduction of the slices into the extraction tower in order to prevent undesirable effects or chemical reactions that may take place in the beet slices or in the extraction process because of the presence of such air. To insure that the beet slices are introduced into the tower free of air, they are immersed or mashed in juice or other liquid prior to their entering the tower and any air surrounding the slices is expelled from the apparatus. For this purpose, juice or other liquid may be introduced into the worm in such a quantity that it will completely cover the beet slices and force the air surrounding the slices out of the worm. In such case, the worm may be suitably enclosed and provided with a screen through which air and excess juice can escape. Following their deaeration, the beet slices may then be pumped directly into the tower.

A further advantage of the present invention is that scarcely any particles of beet slices will be carried along by the rising juice so that the juice screens which are usually used in connection with such extraction devices and which give rise to certain difficulties may be dispensed with entirely. In accordance with the present invention, the raw juice can be discharged freely and the few small beet chips which may be carried along in it may be caught by pulp eliminators which are used in any event.

In the drawings, the apparatus for the carrying out of the present invention is diagrammatically shown as follows.

Figure 1:
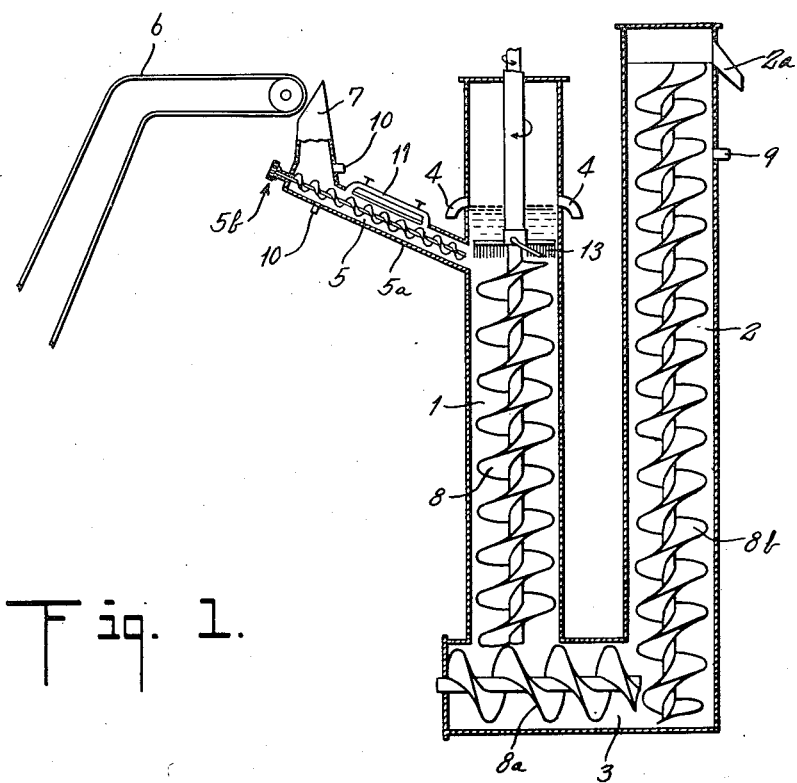
Fig. 1 is a vertical section view illustrating an extracting apparatus embodying the present invention.

Referring to the drawings, Fig. 1 illustrates an apparatus for the extraction of sugar from beet slices in which there are two vertical extraction towers 1 and 2 connected at their lower ends by a cross-member or conduit 3. In the apparatus illustrated, an extraction liquid or solvent is introduced into the tower 2 at a point immediately below an exit or discharge port 2a at the top of the tower 2. The extraction liquid or solvent flows down through the tower 2, then through the cross-member 3 and then upward through the tower 1 to discharge ports 4 at the top of the tower 1 where the raw juices are discharged.

The slices or cossettes of sugar beets are introduced into the apparatus at the top of the tower 1 and are moved downward in a vertical path through the tower 1, then through the conduit 3 and then upward in a vertical path through the tower 2 to the discharge point therein by rotating conveyor worms 8, 8a and 8b in a direction countercurrent to the flow of the extracting liquid or solvent. For a more detailed description of the apparatus just described, reference may be made to United States patent application Serial No. 62,912 filed December 1, 1948 in the name of Karl Wilhelm Hildebrandt for Method for the Continuous Elution of Sugar from Sliced Beets and Apparatus for Use in Such Method.

Figure 3:
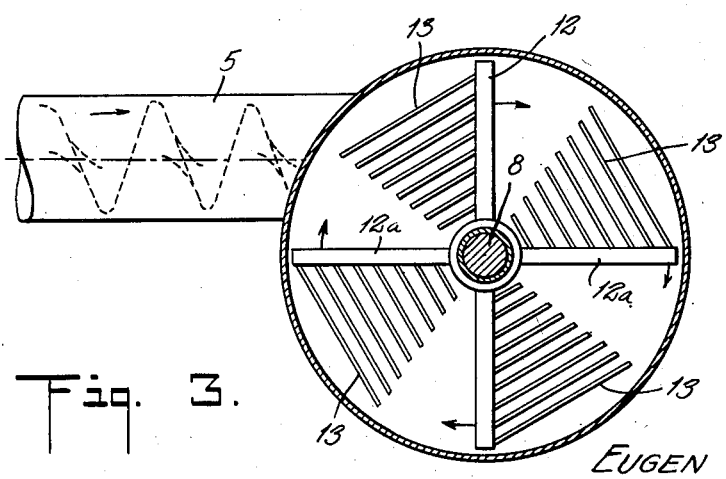
Fig. 3 is a section view taken along the line 3—3 of Fig. 2.

In accordance with the present invention, the cut slices or cossettes of the sugar beets from which the sugar is to be extracted are introduced into the vertical extraction tower 1 at a point below the juice discharge ports 4 by a feed worm 5. As shown in Fig. 1, the feed worm 5 receives the raw material after suitable treatment via a transverse belt 6 and a filling stack 7. The discharge end or the worm 5, as can be noted from Fig. 3, is displaced somewhat from the center of the extraction tower being in effect tangential thereto and it is positioned so that it discharges the slices in a direction opposed to the direction of rotation of the conveyor worm 8 in the tower 1. A suitable casing 5a may be provided for the worm 5 and the worm may be driven in a suitable manner as indicated at 5b. Also the speed at which the worm rotates may be regulated so as to control the rate at which the slices are introduced into the tower as desired. Connections 10 are provided in the casing 5a of the worm 5 and a liquid or juice of any desired concentration may be introduced through these ports into the casing as the beet slices enter the worm 5. The immersion or mashing of beet slices in the liquid or juice in the casing, forces the air surrounding them or entrapped in their mass out and such air and any excess juice is then expelled from the casing through a screening device 11 in the casing.

Figure 2:
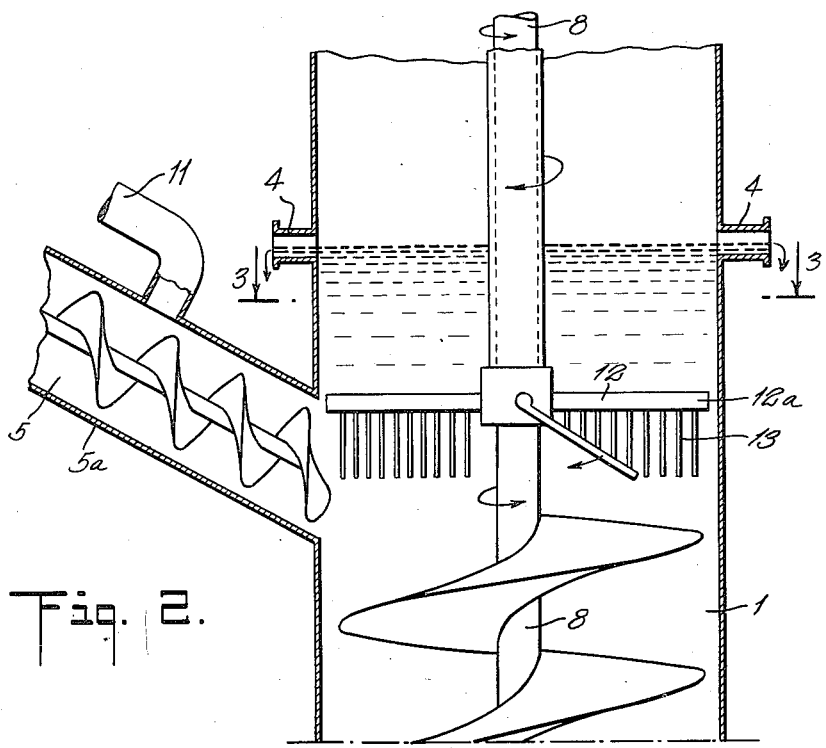
Fig. 2 is a vertical section on an enlarged scale of a portion of the apparatus illustrated in Fig. 1 including a distributor.

As shown in Figs. 2 and 3, a distributor 12 may be provided at the top of the tower 1 at the charging point of the sugar beet slices. The distributor 12 is rotatably mounted on the shaft of the main conveyor or worm screw 8 and is rotated in a direction opposite to the direction of rotation of the main worm 8 as indicated by the arrows in the drawings. The distributor 12 has a series of radially extending arms 12a from which rods or bars 13 having obliquely inclined surfaces extend downwardly. The obliquely inclined surfaces of the rods 13 engage with the beet slices as they leave the discharge end of the feed worm 5 and enter the tower 1 spreading the slices evenly over the surface of the main conveyor worm 8 thus, insuring a uniform distribution of the slices in their movement through the tower. In addition, the rods 13 also press back onto the main conveyor worm any beet slices that tend to rise with the liquid or that may possibly be forced upwards.

It will be understood that various changes and modifications may be made in the embodiment of the invention illustrated and described herein without departing from the scope of the claims as appended hereto.

I claim:

1. In a process for extracting substances from a raw material wherein said extraction is carried in a vertical extraction tower into which the raw material is introduced at the upper end thereof and is moved through the tower by a rotating conveyor worm in a direction countercurrent to the flow of an extracting liquid in said tower with raw juices containing the extracted substance being discharged from said tower at the upper end thereof characterized by continuously introducing raw material containing the substance to be extracted under pressure and at a uniform rate into the vertical extraction tower at the upper end thereof and at a point below the level of a point where the raw juices are discharged from the tower.

2. In a process for extracting substances from a raw material as defined in claim 1 in which the raw material is introduced tangentially to the vertical tower and in a direction opposite to the direction of rotation of the conveyor worm therein.

3. In an apparatus for extracting sugar from cut sections of sugar-bearing material the combination with a vertical extraction tower having a rotating conveyor worm therein for moving the cut sections through the conveyor in a direction countercurrent to the flow of an extraction liquid, and having discharge ports for discharging the raw juices containing the extracted sugar from the tower located at the upper end of said tower, of a feed worm for delivering cut sections to the upper end of the vertical extraction chamber, said feed worm having its discharge end located beneath the level of the liquid in said tower, a casing surrounding said worm, connections for supplying liquid to said casing and a screen communicating with said casing for permitting the escape of liquid and air therefrom.

4. In an apparatus for extracting sugar from cut sections of sugar-bearing material, the combination as defined in claim 3 wherein the discharge end of feed worm is positioned tangentially to the extraction tower and discharges in a direction opposite to the direction of rotation of the rotating conveyor screw therein.

5. In an apparatus for extracting sugar from cut sections of sugar-bearing material the combination with a vertical extraction tower through which the cut sections of sugar-bearing material are moved through said tower by a rotating conveyor worm in a direction countercurrent to the flow of an extracting liquid and the raw juices containing the extracted sugar are discharged through ports at the upper end of said tower, of a feed worm for delivering cut sections of sugar-bearing material to the upper end of the vertical extraction tower, said worm having its discharge end positioned beneath the level of the liquid in the extraction tower, a distributor rotatably supported in the extraction tower above the discharge end of the feed worm, said distributor having downwardly extending members with obliquely inclined surfaces, said downwardly extending members being positioned to engage with the cut sections of sugar-bearing material discharged by the feed worm and spread said slices over the top of the conveyor worm, and means for rotating said distributor in a direction opposite to the direction of rotation of the conveyor worm.

6. In an apparatus for extracting sugar from cut sections of sugar-bearing material, the combination as defined in claim 5 wherein the discharge end of feed worm is positioned tangentially to the extraction tower and discharges in a direction opposite to the direction of rotation of the rotating conveyor screw therein.

7. In an apparatus for extracting sugar from cut sections of sugar-bearing material, the combination as defined in claim 5 wherein the discharge end of feed worm is positioned tangentially to the extraction tower and discharges in a direction opposite to the direction of rotation of the rotating conveyor screw therein and a casing surrounds the feed worm, said casing having ports for admitting juices thereto and a screen for permitting the escape of air and juices therefrom.

8. In an apparatus for extracting sugar from cut sections of sugar-bearing material the combination which includes a vertical extraction tower, a rotating conveyor worm in said tower for moving cut sections of sugar-bearing material through said tower in a direction countercurrent to the flow of an extracting liquid, said tower having ports located above the end of the conveyor worm for discharging the raw juices containing the extracted sugar from said tower and a feed worm for delivering the cut sections of sugar-bearing material to the upper end of the vertical extraction tower, said feed worm having its discharge end positioned above the upper end of the conveyor worm and beneath the level of the liquid in the extraction tower.

9. In an apparatus for extracting sugar from cut sections of sugar-bearing material, the combination as defined in claim 8 wherein the discharge end of a feed worm is positioned tangentially to the extraction tower and discharges in a direction opposite to the direction of rotation of the rotating conveyor screw therein.

EUGEN LANGEN.

REFERENCES CITED

The following references are of record in the file of this patent:

UNITED STATES PATENTS

| Number | Name | Date |
| --- | --- | --- |
| 706,669 | Kessler | Aug. 12, 1902 |
| 1,782,603 | Camuset | Nov. 25, 1930 |
| 1,961,420 | Hildebrandt | June 5, 1934 |
| 2,483,864 | Zeiss | Oct. 4, 1949 |

FOREIGN PATENTS

| Number | Country | Date |
| --- | --- | --- |
| 287,896 | Germany | Oct. 11, 1915 |
| 404,769 | Great Britain | Jan. 25, 1934 |